UNITED STATES PATENT OFFICE.

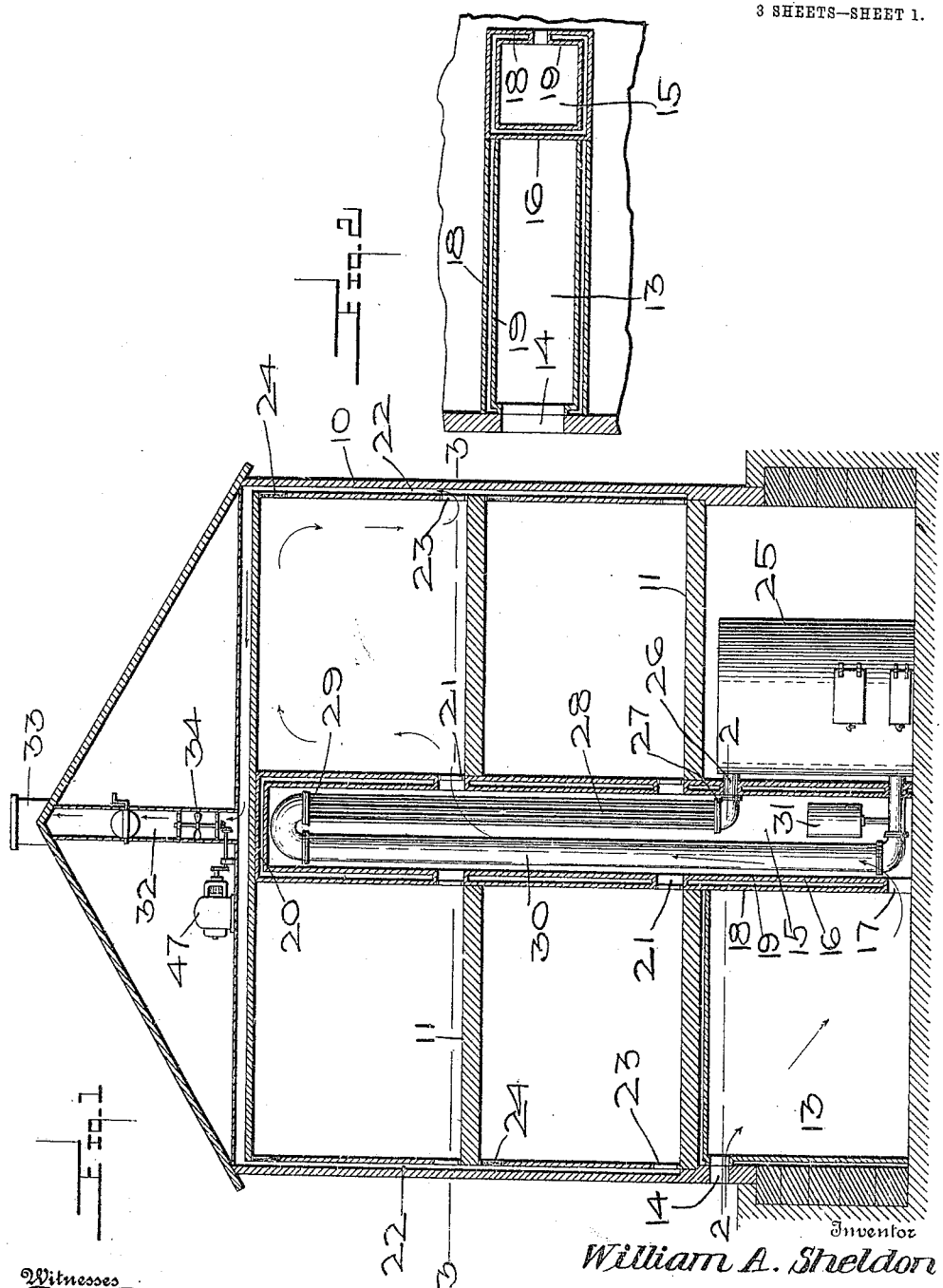

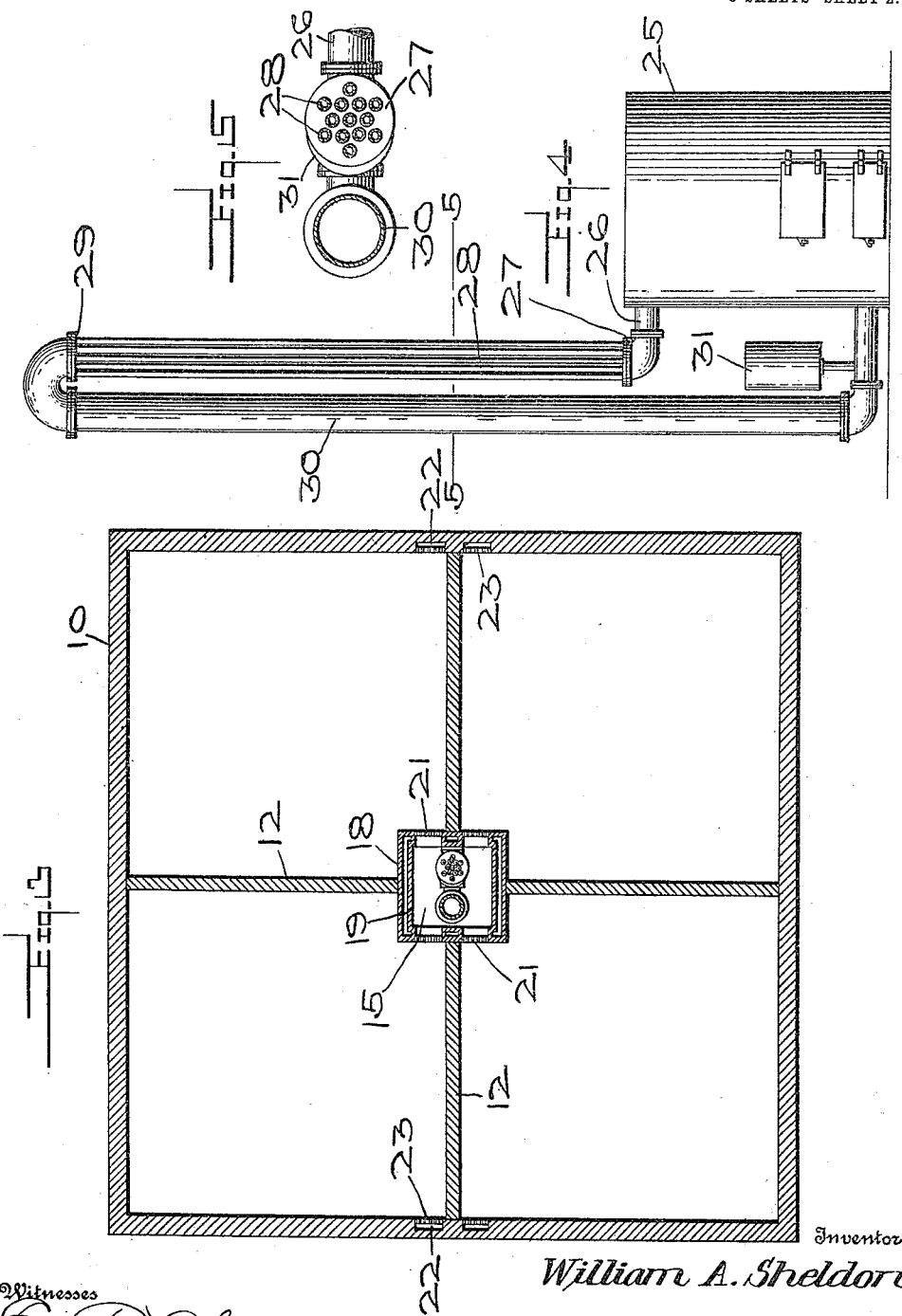

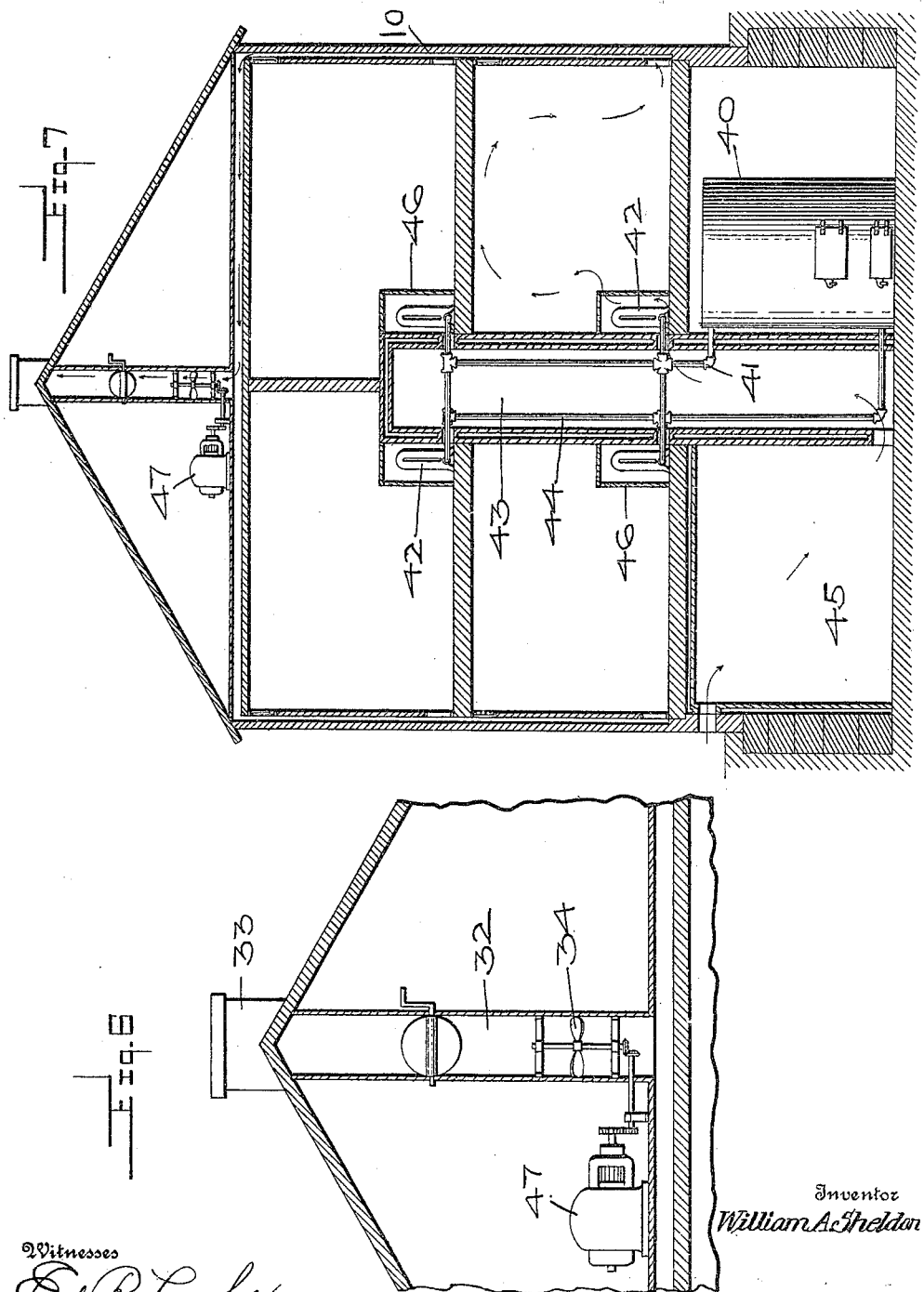

WILLIAM A. SHELDON, OF MARENGO, ILLINOIS.

TEMPERATURE-REGULATING SYSTEM.

963,255.          Specification of Letters Patent.      Patented July 5, 1910.

Application filed November 30, 1908. Serial No. 465,123.

*To all whom it may concern:*

Be it known that I, WILLIAM A. SHELDON, a citizen of the United States, residing at Marengo, in the county of McHenry and State of Illinois, have invented certain new and useful Improvements in Temperature-Regulating Systems, of which the following is a specification.

This invention relates to heating and cooling systems, and has special reference to a device of this character which is applicable to houses of common construction.

An object of this invention is to form a system whereby a house may be heated or cooled by the employment of the same system as is found necessary owing to the changes in temperature.

The invention has for another object a system of this character which can be utilized as a ventilator as in employing the same a current of air is passed constantly through the several rooms of the building.

The invention has for a still further object an improved construction of heating chamber for retaining a constant temperature therein through which is passed the air current applied to the building.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a vertical transverse section of a building having the system applied thereto, Fig. 2 is a section on the line 2—2 of Fig. 1, Fig. 3 is a horizontal sectional view of the building having the system applied thereto, Fig. 4 is a detailed and enlarged view of the heating element employed within the building, Fig. 5 is a horizontal section through the same on line 5—5 of Fig. 4, Fig. 6 is a fragmentary enlarged view of the upper portion of the building in section showing the outlet flue inserted therein, Fig. 7 is a vertical sectional view of a house having a modified form of the heating system applied thereto.

Referring to the drawings, 10 designates a building which is provided with a number of floors 11 and partitions 12. Disposed beneath the first floor 11 of the building 10 is an inlet chamber 13 which is provided with an opening 14 through which air is adapted to pass into the chamber 13. The opening 14 is located in the outer wall of the building 10 for the purpose of admitting the free air into the system. At the inner opposite extremity of the chamber 13 is positioned a heating chamber 15 which extends vertically and centrally in the building and is divided from the inlet chamber 13 by a partition 16 leaving a passageway 17 for the purpose of admitting air from the inlet chamber 13 into the heating chamber 15. Both the inlet chamber 13 and the heating chamber 15 are provided with the walls 18 and 19 positioned in parallel and spaced apart from each other, the walls being filled with a non-heat-conducting substance or if desired, the space between the same may be formed into a vacuum, making the walls themselves non-conducting. The upper extremity of the heating chamber 15 is closed by a top 20 for the purpose of preventing the escape of the heated air when carried into the same.

The heating chamber 15 is provided with registers or inlet valves 21 in the opposite sides which open directly into the several rooms formed in the building 10. The registers 21 are formed near the floors 11 of the building to cause a circulation through the entire building. Within the outside walls 10 are positioned ventilating flues 22 which extend vertically throughout the building and are in communication with the rooms of the same by means of the outlet valves 23 and 24 positioned at the bottom and at the top of each room respectively.

For the purpose of heating the air which passes through the heating chamber 15 a boiler 25 is employed which is positioned beneath the first floor 11 of the building and which is arranged to heat an amount of water contained in a plurality of pipes disposed preferably in a vertical position within the heating chamber 15. A pipe 26 leads from the upper end of the furnace 25 to a header 27 which receives the lower extremities of a plurality of small pipes 28 which communicate at their upper extremities with the header 29 secured thereto. The header 29 is connected to the lower end of the boiler 25 by a return pipe 30 which is of large diameter. The object in forming the return pipe 30 of large dimensions is for the purpose of conducting a large body of the water to the furnace and of preventing the same from being raised in temperature owing to the proximity of the small radiating tubes 28. The pipe 30 is provided with an air chamber 31 which is in communication at the lower end thereof for receiving undue pressure within the pipes 28 owing to the expansion of the water by reason of the introduction of heat into the same. The air chamber 31 thus prevents the bursting of the pipes 28. The flues 22 are extended centrally of the building at their upper ends and are connected to a main flue 32 which exhausts into the chimney 33. A fan 34 is positioned within the main exhaust flue 32 for the production of a forced draft throughout the system. The fan 34 may be driven in any convenient or suitable manner as by a motor 47.

In operation, when the fan 34 is set in motion a suction is caused through the flues 22 which withdraws the air from the rooms of the building and causes air from the heating chamber 15 to enter the rooms. The air about the building is drawn through the opening 14 into the inlet chamber 13 and conveyed therethrough into the chamber 15. As the boiler 25 is supplying the pipes 28 with hot water the air is raised in temperature as it passes upwardly in the chamber 15. If it is desired to cool the building a quantity of ice is placed within the inlet chamber 13 about which the air is caused to travel to enter into the chamber 15. Other means for cooling the chamber 13 may be employed without departing from the spirit of the invention. The cool air in the chamber 15 enters through the registers 21 into the rooms of the building 10 and exhausts therefrom through the flues 22 into the chimney 33. The valves 24 which are positioned at the upper ends of the rooms are opened to allow heat to pass out of the same when the rooms are subject to the cooling system while the lower valves 23 which are positioned at the bottom of the rooms are opened to allow the escape of the cool air which collects in the lowermost portions of the rooms. Therefore when the rooms are to be heated, as in winter, the upper valves 23 are closed to confine the heat in the rooms and the lower valves 24 are opened to allow the vitiated air to escape. In small systems the fan 34 may be eliminated as the heated air will rise and give place to the cooler air and thus ventilate the rooms without the aid of a fan.

In the modification shown in Fig. 7 the building 10 is provided with a boiler 40 positioned beneath the first floor thereof which is provided with the hot water conducting pipe 41 which leads to radiators 42 positioned within the rooms of the building adjacent the central flue 43 and is provided with the return pipe 44 which leads from the radiators 42 to return the water to the boiler 40. The central flue 43 is connected to an inlet chamber 45 which is connected through the outer wall of the building with the surrounding atmosphere and through which a current of air is adapted to naturally flow. The flue 43 is provided with a plurality of openings communicating with the hoods 46 positioned about the radiators 42 to direct the air currents about the radiators before the entrance of the same into the rooms of the building. The hoods 46 are each provided with a plurality of openings therethrough for admitting of the passage of air into the rooms after the same has been thoroughly heated by reason of its contact with the radiators 42. The building is provided with the ventilating and outlet means above described in connection with the preferred form.

What is claimed is:—

1. In a heating system, the combination with a building, of a vertically disposed heating chamber located within the building, an inlet chamber located at the lower end of the heating chamber and laterally thereof and communicating with the atmosphere, an insulating wall between the heating chamber and the inlet chamber, said insulating wall having an access passage therethrough for the admittance of air from the inlet chamber to the heating chamber, said heating chamber having a plurality of egress openings therein, a water heating furnace located outwardly of the heating chamber at the lower portion thereof, a plurality of heat radiating pipes disposed within the heating chamber and communicating with the water chamber of the furnace, an enlarged pipe communicating with the upper end of the plurality of pipes and with the water chamber of the furnace, said enlarged pipe lying within the heating chamber and means for effecting a draft through the heating chamber and the inlet chamber.

2. In a heating system, the combination with a building having inner wall spaces, of a stack communicating with the inner wall spaces, a fan in the stack, the walls of the building having openings communicating with the rooms of the building and with the inner wall spaces, said openings being located at the upper and lower portions of the rooms, a heating chamber located within the building and extending vertically therethrough, said heating chamber having insulating walls and having openings in its walls communicating with the rooms of the building adjacent to the lower portions thereof, an air inlet chamber located in the lower portion of the building and laterally of the heating chamber and communicating with the atmosphere, said air inlet chamber communicating with the lower portion of the heating chamber, a furnace and heat conducting pipes communicating with the furnace and lying within the heating chamber.

3. In a device of the character described, the combination with a building, of a heating chamber vertically and centrally disposed in said building, an inlet chamber positioned in the lower portion of said building and communicating with said heating chamber and with the atmosphere, a boiler positioned in the building outwardly of the heating chamber, a water tube extended from the upper extremity of said boiler into said heating chamber, a horizontally disposed head connected to said water tube, a plurality of vertically disposed radiating tubes of small diameter extended upwardly from said head in said heating chamber, a second head horizontally disposed across the upper extremities of said radiating tubes, a return pipe of large diameter disposed between said second named head and the lower portion of the boiler, said water tubes adapted to raise the temperature of air which is passed through said heating chamber thereabout and means for conducting the heated air from said heating chamber through the building.

In testimony whereof I affix my signature, in presence of two witnesses.

WILLIAM A. SHELDON.

Witnesses:
JOSIAH BARFIELD,
MAURICE B. BARR.